UNITED STATES PATENT OFFICE

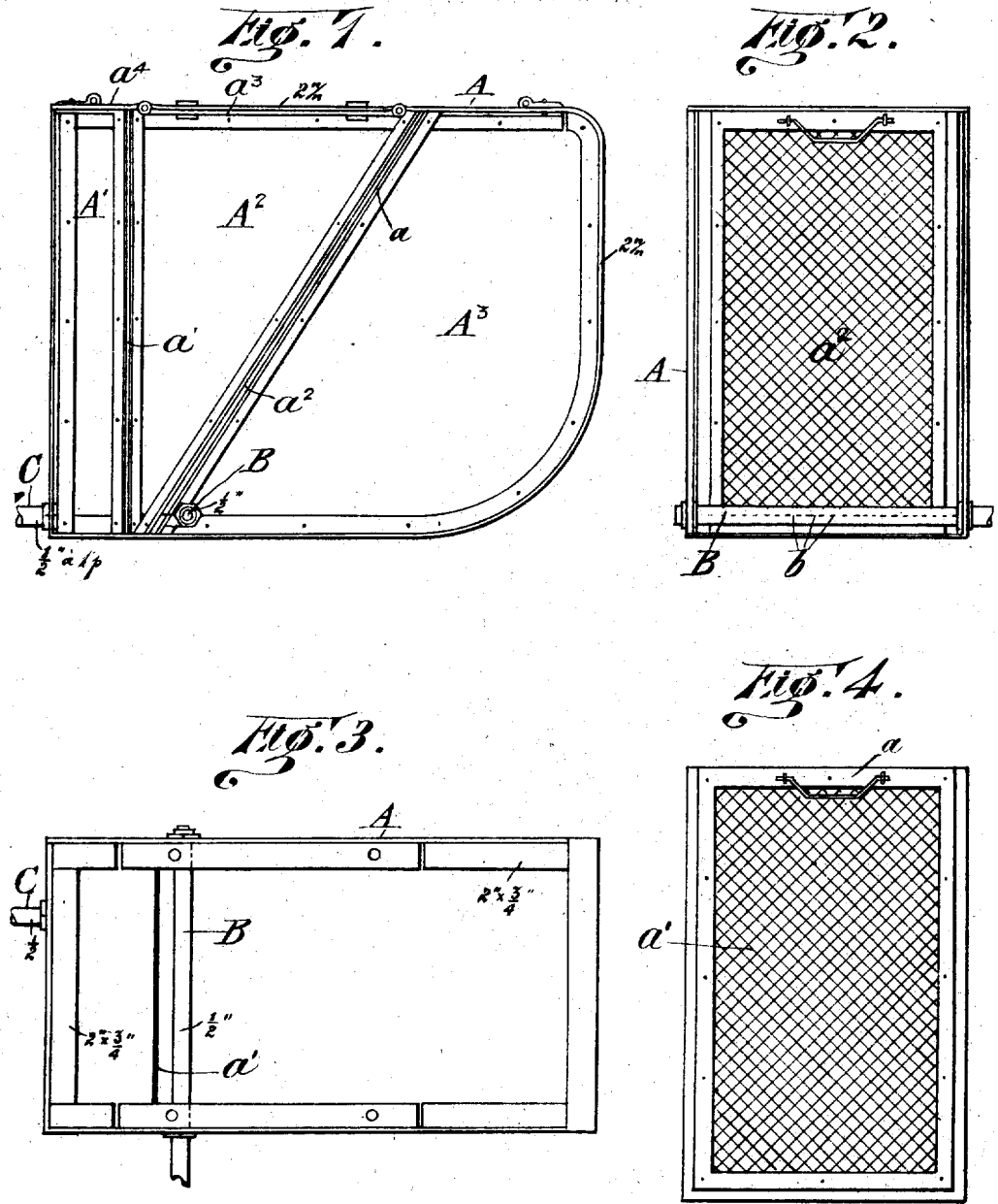

FÉLIX BRUN, OF ST. PETERSBURG, RUSSIA.

APPARATUS FOR GENERATING A SOLUTION FOR PREVENTING INCRUSTATION IN STEAM-BOILERS.

No. 897,452.

Specification of Letters Patent.

Patented Sept. 1, 1908.

Application filed September 10, 1906. Serial No. 334,030.

*To all whom it may concern:*

Be it known that I, FÉLIX BRUN, a citizen of the Republic of France, residing at embassy of France, St. Petersburg, Russia, have invented certain new and useful Improvements in Apparatus for Generating a Solution for Preventing Incrustation in Steam-Boilers; and I do hereby declare that the following is a full, clear, and exact description of the invention, such as will enable others skilled in the art to which it appertains to make and use the same.

The invention to be hereinafter described relates to a suitable apparatus for generating or manufacturing a solution to be mixed with water contained in steam boilers or the like for preventing the forming of a crust on the inner surfaces thereof.

Broadly speaking, this invention comprises a novel apparatus lying wholly without the boiler, adapted to receive and contain the elements entering into the solution, to contain the solution when made, and to deliver the solution direct to the boiler as required.

In order to more clearly expose and specifically define the invention above, reference will be had to the accompanying drawings, wherein similar reference characters designate like parts in the several views.

Figure 1 is a side view of the apparatus; Fig. 2 is a plan view of partition screen $a^2$, showing its relative position to feed pipe B; Fig. 3 is a plan view of the interior of the apparatus; and, Fig. 4 is a plan view of partition screen $a^1$.

In the drawings, the generating apparatus as a whole is designated by the letter A, and comprises three separate and distinct compartments $A^1$, $A^2$, $A^3$; the compartments $A^1$ and $A^2$ being separated by a vertical screen $a^1$, said screen being preferably removably inserted within said generator through guideways or the like. Compartments $A^2$ and $A^3$ are similarly separated by a removably inserted inclined screen $a^2$, the lower end of said screen lying adjacent the lower end of screen $a^1$, and forming therewith the angular chamber $A^2$, wherein the flax seed is placed for generating the solution as hereinafter described. Screen $a^2$ may be inserted in the same manner as screen $a^1$, previously described.

In order to make the generator liquid proof to securely contain the solution, it is preferably formed and inclosed on all sides by sheet metal or the like, and provided on its upper side with hinged doors $a^3$ and $a^4$, opening respectively into compartments $A^2$ and $A^1$, whereby the flax seed may be placed within the chambers and the chambers inspected at will.

For maintaining the flax seed and the solution in the generator in continuous agitation, I have provided a perforate pipe B, provided with opening $b$ (see Fig. 2) for admitting hot water, steam, or a combination of the two, to the generator. In the preferred form of the device, I have placed this pipe B transversely of the generator, beneath the lower end of a screen $a^2$. By so placing the pipe, and by having the openings $b$ lying beneath the lower end of the screen as above, it is obvious that the incoming fluid will create a continuous circulation within the generator as a whole, and chamber $A^2$ in particular. Due to the inclination of screen $a^2$, it is clear that flax seed placed thereon will tend to sift toward the bottom thereof, and as above set forth, the circulation generated by pipe B will obviously return what seed does so settle toward the top of the screen.

Pipe B, as above indicated, is the delivery or inlet pipe, whereby the hot water or other liquid for generating the solution may be admitted to the generator, and in the preferred form of the device this pipe connects with a superheating attachment of the boiler. That is, the generator lies entirely outside of the boiler in which the solution is to be used, and it is necessary to establish communication between said boiler and said generator, which may be done by any suitable form of pipe or tube connection, herein shown as pipe C, said pipe being joined directly to the lower end of chamber $A^1$.

From the foregoing description, it will be clearly understood that in order to generate the desired solution and to deliver the same to the boiler wherein it is to be used, it is only necessary to place within compartment or chamber $A^2$ the desired amount of flax seed or other agent, to admit hot water, steam, a combination of the two or other fluid to the generator through pipe B, thereby continuously agitating the mixture and generating the solution, and finally to draw off and deliver from said generator to the boiler a solution so generated by means of pipe C.

Having described and set forth my inven- what I claim and desire to secure by Letters Patent, is:—

1. In an apparatus for the generation of a cleaning solution for the interior of boilers, a generator comprising a plurality of compartments or chambers, removable partition screens separating said chambers, means for delivering to said generator fluid in the form of spray, and connections between said generator and a boiler wherein the solution is to be used, whereby the solution may be delivered to the boiler.

2. In an apparatus for generating a cleaning solution for the interior of boilers, a generator comprising a plurality of chambers, removable partition screens separating said chambers, said screens forming between them an angular chamber wherein the flax seed or other solution generating agent is placed, a perforate delivery pipe for admitting fluid to said generator in the form of spray, and suitable connections between one of the other of said chambers and a boiler wherein said solution is to be used, whereby the solution may be transferred from the generator to said boiler.

3. In an apparatus for generating a cleaning solution for boilers, a generator comprising a plurality of chambers, a vertical screen removably inserted within said generator dividing the same into two chambers, an inclined partition screen similarly inserted within said generator, and forming between it and the aforesaid screen an angular chamber, a perforate delivery pipe lying beneath the lower end of said inclined screen and adapted to admit fluid in the form of spray to said generator, and suitable connections between the rear chamber and a boiler wherein said solution is to be used, whereby the solution may be transferred from said generator to said boiler.

4. In an apparatus for generating a cleaning solution for the interior of boilers, a generator comprising a plurality of chambers, removably inserted partition screens separating said chambers from one another, a delivery pipe lying beneath one of said screens and having perforations on the surface adjacent said screen, whereby fluid may be admitted to the chamber through said perforations and simultaneously forced through the aforesaid screen, and suitable connections between said generator and a boiler wherein the solution is to be used, whereby said solution may be transferred from said generator to said boiler.

5. In an apparatus for generating a cleaning solution for boilers, a generator comprising a plurality of chambers, two removably inserted screens separating said chambers from one another, one of said screens being inclined relatively to the other and forming therebetween an angular chamber, a perforate delivery pipe lying beneath the lower end of said inclined screen and having perforations on the surface adjoining the said screen, whereby fluid for generating the solution may be admitted in the form of spray and simultaneously forced through said screen to thereby remove from the inner face of said screen any collected solution generating agent and to keep in continuous circulation the solution so formed within the generator, and suitable connections between said generator and a boiler wherein said solution is to be used, whereby said solution may be transferred from the generator to said boiler.

In witness whereof I have hereunto set my hand in the presence of two witnesses.

FÉLIX BRUN.

Witnesses:
N. D. FOMIN,
AUG. MIGHIS.